Oct. 2, 1962

G. B. MATTER 3,056,173

PNEUMATIC FIBER FELTING HEAD

Filed July 11, 1958

INVENTOR.
GEORGE B. MATTER

BY Leslie G. Noller

ATTORNEY

Oct. 2, 1962 G. B. MATTER 3,056,173
PNEUMATIC FIBER FELTING HEAD
Filed July 11, 1958 2 Sheets-Sheet 2

INVENTOR.
GEORGE B. MATTER
BY
ATTORNEY

3,056,173
PNEUMATIC FIBER FELTING HEAD

George B. Matter, Longview, Wash., assignor to Weyerhaeuser Company, Tacoma, Wash., a corporation of Washington
Filed July 11, 1958, Ser. No. 748,078
9 Claims. (Cl. 19—156)

The present invention relates generally to felting fibers from gaseous suspension onto a continuously moving filtering conveyor passing through a deposition area and apparatus therefor. In particular, it relates to a dispersing head having perforations for effecting individualization of the fibers just prior to their felting.

A conventional way to form air-laid fiber felts makes use of a perforated dispersing head containing a stock of agitated fiber at superatmospheric pressure, which stock is continuously replenished and drawn upon. A constant stream of air passes through the head and in so doing sweeps individual fibers from the head into the depositing region. A suitable agitator is provided in the head to keep the stock fluffy and uniformly available for the desired uniformity of out feed. Conditions at the dispersing head crosswise of the moving conveyor must be uniform, but may vary longitudinally in the direction parallel to the said movement. A semi-cylindrical dispersing head with its axis crosswise of the moving conveyor is ideal to meet these conditions. To maintain some degree of order in the agitation, a constant speed mechanism is used for agitation.

The air-pressure in the head causes a leaving current of air to carry individual fibers speedily away from the head into a depositing region where the felt is formed. The depositing region is defined by passing a continuously moving filter, such as a wire screen, over an area maintained at subatmospheric pressure, and placing the dispersing head in spaced proximity to the suction area and substantially entirely within its sphere of influence in operation. The pressure in the head and the suction below the screen are so related that a continuous and constant stream of air carrying fibers passes through the atmosphere to the depositing region and is there filtered to form the felt.

In forming a continuous mat by filtration on a moving mechanical filter, the exposed surface of the filter varies from that of the mechanical filter itself at one extreme to that of the deposited mat at the other extreme. This increasing thickness of the deposited mat varies inversely the rate of perpendicular air flow from the forward end of the depositing region to the opposite end which creates an air stream moving from front to rear of the depositing region.

Furthermore, for effective felting and intertwining of the fibers within the mat it is preferred that the suction system carry more air than the pressure system sweeping the fibers through the perforated head. This results in additional air entering the depositing region from the atmosphere, as indicated more particularly hereinafter in the drawings by arrow 25, increasing the rearward flow of the air stream in the depositing region.

Such an air stream in effect creates a winnowing chamber in the depositing region wherein the fiber stream being deposited from the dispersing head is air fractionated with the fine fibers being carried and deposited towards the rear of the depositing region. The resulting mat shows a variation in coarseness modulus of the fiber from top to bottom with the top surface having a higher ratio of coarse to fine fibers and a surface less smooth and uniform than would be expected from the coarseness modulus of the original fiber.

In making dense, hot-pressed articles from air laid mats, surface smoothness and uniformity is often very important. This is particularly so where such articles are to be provided with surface coatings or overlaid with decorative materials and the presence of large fibers or bundles of fibers on the mat surface would telegraph through said coatings, detracting from their appearance. The present invention not only avoids the difficulty of forming surfaces having a high ratio of coarse to fine fibers but provides a mat with a surface layer having a higher ratio of fine to coarse fiber than would be expected from the coarseness modulus of the original fiber thus resulting in article surfaces of improved smoothness and uniformity.

It is a general object of the invention to provide an air-laying felter in which fibers are felted to a mat of controlled regions of predetermined ratios of coarse fibers to fine fibers.

It is a general object of the invention to provide a felter dispersing head having a prearranged pattern of different size perforations for controlling fiber distribution.

It is a particular object of the invention to provide an air-laid fiber felt having a smooth and uniform fiber layer on one or both surfaces.

Various other ancillary objects and advantages will become apparent from the following description and explanation of the invention, as described with reference to the accompanying drawings wherein the numerals refer to like parts throughout, and in which.

Figure 1:
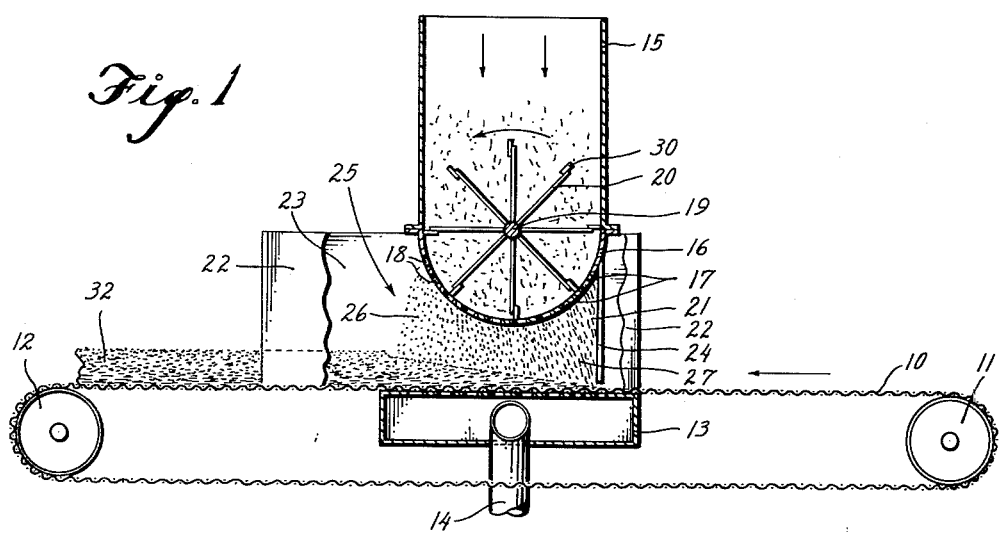
FIG. 1 is a detailed view in vertical cross-section showing the principal features of the dispersing head and various parts of the felter functioning therewith.

The illustrated apparatus in FIG. 1 provides an endless wire screen 10 between end rolls 11 and 12, at least one of which is rotated by a power source not shown. The screen 10 preferably moves in a horizontal plane over a suction box 13 located below the upper stretch of the screen 10. The suction box is connected by conduit 14 to the intake of a suitable blower not shown. Above the suction box there is a fiber disperser generally designated 15 containing a stock of agitated fiber at superatmospheric pressure, said stock being continuously delivered and maintained at said pressure by a suitable means not shown such as by a connection through a conduit to the pressure side of a suitable blower.

The bottom opening of the disperser 15 is closed by a perforated head, preferably a semi-cylindrical dispersing head 16. An arc of about 100° of the periphery is perforated with holes 17 of size to effect substantial individualization of the fibers in their passage from the dispenser head 16 to the screen 10. Spaced above and forward of the 100° arc of holes 17 is a further region of smaller size holes 18. In the case of wood fibers previously defibrated substantially as individualized ultimate fibers of the wood, the holes 17 may be 5/16 inch in diameter whereas the holes 18 may be 1/8 inch in diameter. The more numerous the holes, the greater the capacity of the system. A wide variety of hole sizes, shapes and arrangements are permitted.

Figure 3:
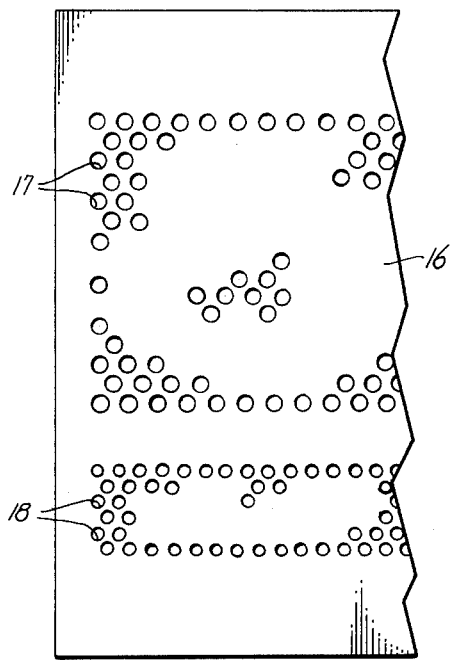
FIG. 3 is a development of one embodiment of the perforated dispersing head.

As illustrated in FIG. 3 and as used in one studied embodiment of the invention, the perforated head consisted of 16 gauge hot rolled steel 56½ inches in width and 51⅝ inches in length. Nineteen rows of holes 17, 5/16 inch in diameter, were aligned along the head 16 on 5/8 inch centers, staggered in adjacent rows. Spaced forward 3 inches from the front row of holes 17, twelve rows of holes 18, 1/8 inch in diameter, were aligned on 3/8 inch centers, staggered in adjacent rows. These dimensions may be varied depending upon the characteristics of the fiber being processed and other variables.

Within the dispersing head is a co-axial rotor 19 with blades 20 which preferably have nylon bristle brushes 30 to wipe fibers through the perforations. The rotor is driven by a suitable power means, not shown, so as to turn at a high speed, as in a range from 175 to 600 r.p.m. Its direction is dependent upon variables of the felting procedure and characteristics of the mats being formed. For the embodiment of this invention illustrated in FIGURE 1, it is preferred that the rotor be turning counterclockwise or opposite the direction of travel of the upper surface of the endless screen.

The area between the dispersing head and the upper surface of the endless screen is the depositing region and is generally designated 21. This region is usually enclosed by baffles 22 and 23 along its lateral edges and by a rear baffle 24 to minimize disturbing effects of air currents on the belt 32 forming as shown.

As mentioned before a winnowing air stream 25 moves from front to rear in this depositing region. By providing a perforated head 16 having two sets of holes 17 and 18 of different sizes with the set of smaller holes 18 being spaced apart, forward and above the set of large holes 17 on the periphery of the dispersing head 16, some of the fine fibers 26 are separated from the original stock of agitated fiber and despite the winnowing air stream their trajectories are such as not to create any substantial overlapping of the main fiber stream 27 being deposited and thus they are deposited as a surface layer on the mat.

One particular study of the particle size distribution of the fibers present at different levels in a mat formed using a felter head similar to that illustrated in FIG. 1 showed the following percent distribution as determined by the weight retained on various size screens.

*Screen Mesh (Tyler Standard)*

|  | +8 | +34 | +50 | +80 | −80 |
|---|---|---|---|---|---|
| Original Fiber | 13.6 | 44.6 | 20.0 | 3.2 | 18.6 |
| Top ⅓ of Mat | 6.8 | 40.6 | 23.0 | 5.0 | 24.6 |
| Bottom ⅔ of Mat | 14.8 | 43.6 | 20.0 | 4.2 | 17.4 |

The great improvement in the uniformity of the mat surface can be readily visualized when the reduction in the +8 and +34 fractions of the upper ⅓ of the mat is observed in comparison with the increase shown for the finer fractions and when contrasted to the percentages shown for the same fractions in the original fiber.

The apparatus of the present invention may be operated over a wide range of conditions for its numerous variables in order to achieve different predetermined effects. The number of different size holes need not be limited to two but additional sizes may be added to give varying mat formations. The spacing between the sets of different size holes may be varied depending upon such variables as air stream velocities, size of depositing region, and desired mat characteristics.

Figure 2:
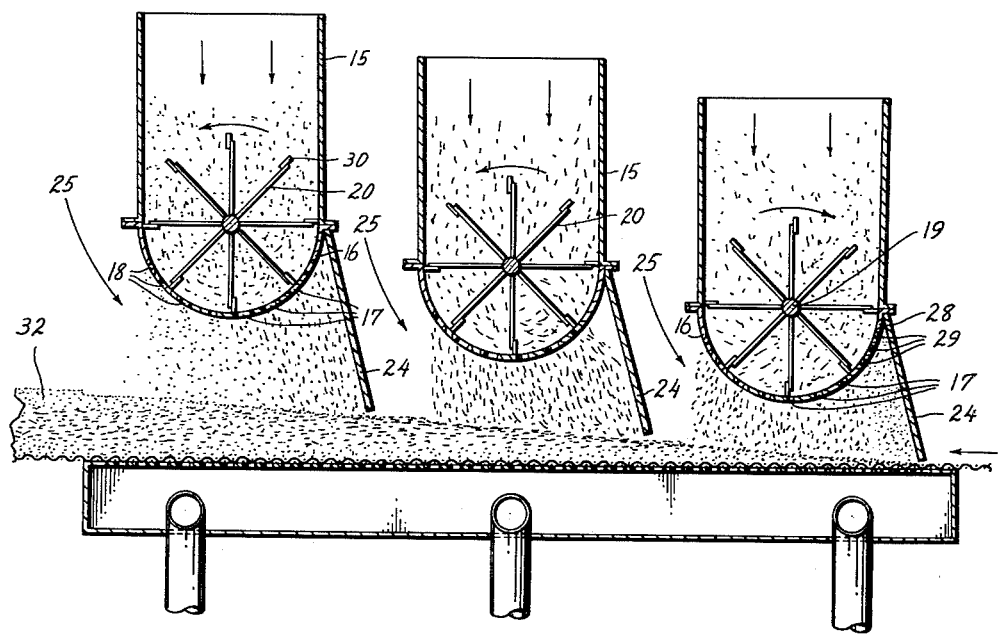
FIG. 2 is a vertical cross-section view illustrating one embodiment of using multiple dispersing heads.

One variation is illustrated in FIGURE 2 wherein three felter heads are arranged in series to provide a mat having fine fiber layers on each surface. This is accomplished by providing the rear dispersing head 28 with the set of small size holes 29 spaced apart, above and to the rear of the set of larger size holes 17. It is also preferred that the direction of the movement of the rotor 19 be opposite that of the rotors in the other two dispersing heads or clockwise. The center dispersing head may have only one size of holes and the forward dispersing head is similar to that illustrated in FIG. 1. This variation of the apparatus of this invention provides a three layer mat with the surface layers having a greater ratio of fine fiber to coarse fiber than the center layer or core.

A similar three layer mat may be provided by use of a single dispersing head with two seats of fine holes placed one above and forward of the regular holes and one above and to the rear of the regular holes. This practice would be particularly effective where thin mats are desired.

Figure 4:
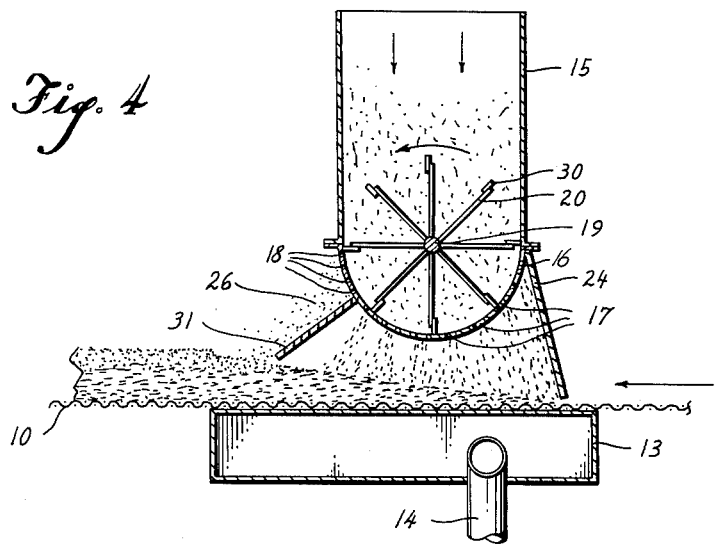
FIG. 4 is a vertical cross-section view illustrating another embodiment of the single head illustrated in FIG. 1.

In instances where relatively large quantities of fiber must be carried through the dispersing head, which in turn requires more open space or holes in the head, it may not be possible to allow for the proper spacing between the sets of different size holes to provide an effective separation. Such lack of proper spacing may be overcome by still another variation of the present invention by placing a baffle 31 between the sets of holes 17 and 18, as illustrated in FIGURE 4. The length of the baffle 31 is so adjusted as to permit the air stream sweeping fiber through the smaller forward holes 18 of the perforated dispersing head to carry the fine fibers 26 over and beyond the said baffle and deposit them on the top surface of the mat.

The invention is not limited to the assembly as illustrated, but from the foregoing it will be appreciated that the apparatus is capable of modification for many kinds of fibers, and for operation in many combinations of variable factors, to produce a wide variety of felts.

I claim:

1. In an apparatus for forming a felted mat of fibers on a travelling surface by depositing the fibers thereon from a pneumatic felter having a semi-cylindrical shaped felter head, the improvement comprised of a main group of holes in the face of the felter head of uniform size of such a dimension that the coarser fibers will be dispersed therethrough, and a second group of holes of smaller uniform size of such dimension that only the finer fibers will be dispersed therethrough, said second group of holes flanking the first group on at least one side of the first group spaced from said first group a distance greater than the spacing between holes in said first group.

2. The apparatus of claim 1 in which the holes of each group are arranged in a series of parallel lines aligned lengthwise of the felter head and the holes in adjacent lines are staggered with respect to each other.

3. The apparatus of claim 2 in which the second group of holes is located forward of the main group.

4. The apparatus of claim 2 in which the second group of holes is located rearward of the main group.

5. The apparatus of claim 2 in which the diameters of the first group of holes are 5/16" spaced from each other on ⅝" centers, and the second group of holes have diameters of ⅛" spaced on ⅜" centers.

6. In an apparatus for forming a felted mat of fibers on a travelling surface by depositing the fibers thereon from a series of pneumatic felters having semi-cylindrical shaped felter heads, the improvement comprised of a main group of holes of uniform size of such a dimension that the coarser fibers will be dispersed therethrough in the face of each of the felter heads, a second group of holes in the face of the forward felter head located forward of its main group of holes and a third group of holes in the face of the rear felter head located rearward of its main group of holes, the said second and third groups of holes being in each case spaced from the main group of holes a distance greater than the spacing between holes in said main group of holes in the respective felter head, and the holes of said second and third groups being of smaller uniform size than those of the main group and of such dimension that only the finer fibers will be dispersed therethrough.

7. The apparatus of claim 6 in which the holes of each group are arranged in a series of parallel lines aligned lengthwise of the felter head, and the holes in adjacent lines are staggered with respect to each other.

8. The apparatus of claim 1 in which the groups of holes are spaced from each other by leaving a blank space of approximately 3 inches between the last line of larger holes and the first line of smaller holes.

9. In an apparatus for forming a felted mat of fibers on a travelling surface by depositing the fibers thereon from a pneumatic felter having a semi-cylindrical shaped felter head, the improvement comprised of a main group of holes in the face of the felter head of uniform size of such a dimension that the coarser fibers will be dispersed therethrough, and a second group of holes of smaller uniform size of such dimension that only the finer fibers will be dispersed therethrough, said second group of holes flanking the first group on at least one side of the first group, and a baffle plate attached to the face of said felter head between said groups of holes and projecting from said felter head fall toward said mat surface.

References Cited in the file of this patent

UNITED STATES PATENTS

| | | |
|---|---|---|
| 2,624,079 | Duvall | Jan. 6, 1953 |
| 2,687,363 | Manning | Aug. 24, 1954 |
| 2,698,271 | Clark | Dec. 28, 1954 |
| 2,738,557 | Anderson et al. | Mar. 20, 1956 |
| 2,751,633 | Clark | June 26, 1956 |
| 2,993,239 | Heritage | July 25, 1961 |

FOREIGN PATENTS

| | | |
|---|---|---|
| 668,216 | Great Britain | Mar. 12, 1952 |